US011235850B2

(12) United States Patent
McLaughlin et al.

(10) Patent No.: US 11,235,850 B2
(45) Date of Patent: Feb. 1, 2022

(54) ARCHED HORIZONTAL PRESSURE DECK TO REAR SPAR GUTTER

(71) Applicant: The Boeing Company, Chicago, IL (US)

(72) Inventors: Mark R. McLaughlin, Snohomish, WA (US); David H. Leibov, Seattle, WA (US); Soma Gopala Rao Paravata, Bothell, WA (US); Alfons Menanno, Edmonds, WA (US); Danilo Vukosav, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 248 days.

(21) Appl. No.: 16/706,266

(22) Filed: Dec. 6, 2019

(65) Prior Publication Data

US 2021/0171182 A1 Jun. 10, 2021

(51) Int. Cl.
*B64C 1/14* (2006.01)
*B64C 1/06* (2006.01)
*B64C 3/26* (2006.01)

(52) U.S. Cl.
CPC .................. *B64C 1/14* (2013.01); *B64C 1/06* (2013.01); *B64C 1/065* (2013.01); *B64C 3/26* (2013.01)

(58) Field of Classification Search
CPC .. B64C 1/14; B64C 1/06; B64C 1/065; B64C 3/26; B64C 1/26; B64C 1/00
See application file for complete search history.

(56) References Cited

U.S. PATENT DOCUMENTS

| 8,745,928 | B2 | 6/2014 | Greiner | |
|---|---|---|---|---|
| 2009/0300991 | A1* | 12/2009 | Paul | B60R 13/07 49/476.1 |
| 2013/0099053 | A1* | 4/2013 | Barmichev | B64D 11/06 244/102 R |
| 2013/0344291 | A1* | 12/2013 | Pearson | B64C 1/10 428/157 |
| 2014/0077035 | A1* | 3/2014 | Gensch | B64C 1/1461 244/129.5 |
| 2015/0008284 | A1* | 1/2015 | Thomas | B64C 1/06 244/119 |
| 2017/0144743 | A1* | 5/2017 | Dickson | B64C 1/40 |

(Continued)

FOREIGN PATENT DOCUMENTS

| EP | 2468975 A1 | 12/2011 |
|---|---|---|
| EP | 3476713 A1 | 8/2018 |

OTHER PUBLICATIONS

Extended European Search Report dated Mar. 2, 2021 in corresponding European Application No. 20195632.3, 7 pages.

*Primary Examiner* — Brian Handville
(74) *Attorney, Agent, or Firm* — MH2 Technology Law Group LLP

(57) ABSTRACT

An arched gutter that can be used to channel moisture within an aircraft can include an arched web including a plurality of laterally spaced arches. The plurality of arches impart a flexibility to the arched gutter such that the arched gutter has an increased resistance to fatigue cracking and other wear and damage resulting from, for example, parasitic loads due to high bending strains that are transferred to the arched gutter by a wing to which the arched gutter is attached during operation of the aircraft. An aircraft section and an aircraft including the arched gutter are also described.

21 Claims, 4 Drawing Sheets

(56) References Cited

U.S. PATENT DOCUMENTS

2018/0162511 A1     6/2018   Larson
2018/0362141 A1*   12/2018   Griess ...................... B64C 1/26
2019/0100332 A1     4/2019   Mindock et al.

* cited by examiner

ARCHED HORIZONTAL PRESSURE DECK TO REAR SPAR GUTTER

TECHNICAL FIELD

The present teachings relate to the field of aircraft and other vessels and, more particularly, to moisture and water control in an aircraft or other vessel.

BACKGROUND

During an operational lifetime of an aircraft, moisture must be carefully collected, channeled, and otherwise controlled to prevent potential problems such as corrosion. In a commercial passenger aircraft, this includes moisture such as grey water from a source such as, for example, sinks in galleys and lavatories, and drip trays. The channeling of moisture can include routing the water from the source to a gutter, then into a drain tube or conduit (i.e., drain mast), and then to an exterior of the aircraft via a wastewater port. Gutters and drain tubes can be located in various sections of the aircraft including under the floor of the passenger compartment. As corrosion can result in structural weakness, increased maintenance, and other problems in an aircraft, and gutter systems are exposed to stresses and strains from normal movement of the aircraft during operation, the gutter systems of the aircraft must be periodically inspected to identify and prevent moisture-related problems. However, the aircraft downtime resulting from such inspections is expensive, as the aircraft must be removed from service, disassembled to some extent, and inspected by trained personnel such as engineers and technicians. A well-designed moisture control system can allow for an increase in the time between required inspections, thereby reducing aircraft downtime and costs.

A new gutter design and assembly that provides improvements over prior gutter designs would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, an arched gutter for an aircraft includes a first edge, a lip at least partially defined by the first edge, a second edge opposite the first edge, an arched web at least partially defined by the second edge, the arched web comprising a plurality of laterally spaced arches, and a trough positioned between the first edge and the second edge. Optionally, the arched gutter can further include a plurality of arch apexes, wherein each arch of the plurality of arches is bounded laterally between a pair of arch apexes that extend longitudinally across at least a portion of a length of the arched gutter. The trough can be positioned between the lip and the arched web, and the lip can transition into the trough, and the trough can transition into the arched web. Further optionally, the arched gutter can include a third edge extending between the first edge and the second edge, a fourth edge opposite the third edge and extending between the first edge and the second edge, and a width defined as a distance between the third edge and the fourth edge, wherein the width is from 140.0 inches to 180.0 inches, and can include a length defined as a distance between the first edge and the second edge, wherein the length is from 11.0 inches to 18.0 inches. In an optional implementation, an upper surface of the arched gutter at the lip is sloped by a first angle of from 4.5° to 6.5° at the third edge, and the upper surface of the arched gutter at the arched web is sloped by a second angle of from 3.1° to 5.1°.

The arched gutter can further include a first surface, a second surface opposite the first surface, and an orifice that extends through the arched gutter from the first surface to the second surface, wherein the orifice comprises a diameter of from 1.5 inches to 3.5 inches.

In another implementation, an aircraft assembly includes an upper wing panel comprising a surface, an aft wheel well bulkhead, a pressure deck connected to the upper wing panel and the aft wheel well bulkhead, and an arched gutter. The arched gutter includes a first edge, a lip at least partially defined by the first edge, wherein the lip is attached to the surface of the upper wing panel, a second edge opposite the first edge, an arched web at least partially defined by the second edge and attached to the pressure deck, the arched web comprising a plurality of laterally spaced arches, and a trough positioned between the first edge and the second edge.

Optionally, the pressure deck can include a plurality of pressure deck arches, and the plurality of laterally spaced arches of the arched web are attached to the plurality of pressure deck arches. Further optionally, the arched gutter can include a plurality of arch apexes, wherein each arch of the plurality of arches of the arched gutter is bounded laterally between a pair of arch apexes that extend longitudinally across at least a portion of a length of the arched gutter. The trough of the arched gutter can be positioned between the lip and the arched web, and the lip can transition into the trough, and the trough can transition into the arched web. In an optional implementation of the aircraft assembly, the arched gutter further includes a third edge extending between the first edge and the second edge, a fourth edge opposite the third edge and extending between the first edge and the second edge, and a width defined as a distance between the third edge and the fourth edge, wherein the width is from 140.0 inches to 180.0 inches, and can also include a length defined as a distance between the first edge and the second edge, wherein the length is from 11.0 inches to 18.0 inches.

In another implementation, an aircraft includes a first wing and a second wing, an upper wing panel including a surface and extending between the first wing and the second wing, an aft wheel well bulkhead, a pressure deck connected to the upper wing panel and the aft wheel well bulkhead, a rear spar connected to the upper wing panel, wherein the rear spar, the aft wheel well bulkhead, and the pressure deck define, at least in part, a wheel well of the aircraft, and an arched gutter extending between the first wing and the second wing. In this implementation, the arched gutter includes a first edge, a lip at least partially defined by the first edge, wherein the lip is attached to the surface of the upper wing panel, a second edge opposite the first edge, an arched web at least partially defined by the second edge and attached to the pressure deck, the arched web comprising a plurality of laterally spaced arches, and a trough positioned between the first edge and the second edge. The aircraft further includes a drain tube in fluid communication with a moisture source, the arched gutter, and the wheel well.

Optionally, the pressure deck can include a plurality of pressure deck arches, and the plurality of laterally spaced arches of the arched web can be attached to the plurality of pressure deck arches. Further optionally, the arched gutter can include a plurality of arch apexes, wherein each arch of the plurality of arches of the arched gutter is bounded laterally between a pair of arch apexes that extend longitudinally across at least a portion of a length of the arched gutter. The trough of the arched gutter can be positioned between the lip and the arched web. In an implementation of the aircraft, the lip transitions into the trough, and the trough transitions into the arched web, and the arched gutter can further include a third edge extending between the first edge and the second edge, a fourth edge opposite the third edge and extending between the first edge and the second edge, a width defined as a distance between the third edge and the fourth edge, and a length defined as a distance between the first edge and the second edge, where the width is from 140.0 inches to 180.0 inches and the length is from 11.0 inches to 18.0 inches.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to example implementations of the present teachings which are illustrated in the accompanying drawings. Generally and/or where convenient, the same reference numbers will be used throughout the drawings to refer to the same or like parts.

As discussed above, moisture within an aircraft must be carefully collected, channeled, and otherwise controlled to prevent problems such as corrosion. In an implementation of the present teachings, moisture from a source such as a sink from a galley or lavatory, and/or another aircraft source, is channeled to an arched gutter. From the arched gutter, the moisture can be channeled into a drain tube that empties, for example, into a wheel well of the aircraft, and then to an exterior of the aircraft.

As used herein, the term "arched" as in "arched gutter" is used to identify a structure having one or more curves or arcs. It will be appreciated that the term "arch" is not limited to a strictly arch shape unless stated otherwise, and that the term will include other curves or arcs such as a sinusoidal arc, a circular arc, a parabolic arc, a flattened arc, a catenary arc, and other types of curves or arcs.

Figure 1:
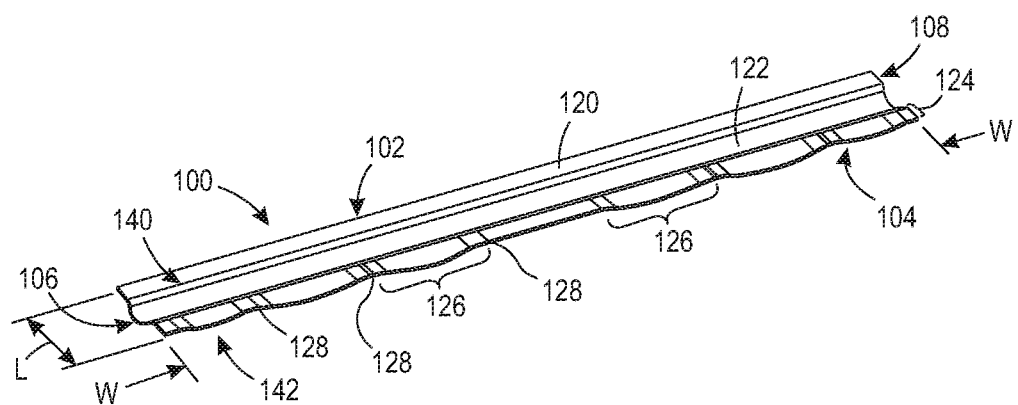
FIG. 1 is a perspective depiction of an arched gutter in accordance with an implementation of the present teachings.

FIG. 1 is a perspective depiction of an arched gutter 100 in accordance with an implementation of the present teachings. A perimeter of the arched gutter 100 is generally defined by a first edge (e.g., a fore or anterior edge) 102, a second edge (e.g., an aft or posterior edge) 104 opposite the first edge 102, a third edge (e.g., a port or first lateral edge) 106 extending between the first edge 102 and the second edge 104, and a fourth edge (e.g., a starboard or second lateral edge) 108 opposite the third edge 106, the fourth edge 108 also extending between the first edge 102 and the second edge 104. (The terms "fore," "forward," "anterior," "aft," "posterior," "port," "starboard," "lateral," "upper," and "lower" are generally used with reference to an orientation of the arched gutter 100 when installed for use within an aircraft.) In the arched gutter of FIG. 1, a length "L" is defined as a greatest distance between the first edge 102 and the second edge 104, and a width "W" is defined as a greatest distance between the third edge 106 and the fourth edge 108.

The arched gutter 100 of FIG. 1 includes various features and structures that enhance the use and operation of the arched gutter 100 within an aircraft compared to conventional gutter systems, as will be described in more detail below. The arched gutter 100 of FIG. 1 further includes a lip 120 at least partially defined by the first edge 102. The lip 120 extends transversely across at least a portion of the width W of the arched gutter 100, for example, from the third edge 106 to the fourth edge 108. FIG. 1 further depicts a trough 122 between the first edge 102 and the second edge 104 that extends transversely, wholly or at least partially, between the width W from the third edge 106 to the fourth edge 108. The arched gutter 100 of FIG. 1 further includes an arched web 124 at least partially defined by the second edge 104. The arched web 124 extends transversely at least part way across the width W of the arched gutter 100 between the third edge 106 and the fourth edge 108. The arched web 124 includes a plurality of laterally spaced arches 126, where each arch 126 is bounded laterally between a pair of arch apexes 128 that extends longitudinally (i.e., in the lengthwise direction "L" of the arched gutter 100) across at least a portion of the length L of the arched gutter 100.

The arched gutter 100 includes a first surface (i.e., an upper surface) 140 and a second surface (i.e., a lower surface) 142 that is opposite the first surface 140. As depicted, the lip 120 transitions into the trough 122, and the trough 122 transitions into the arched web 124, where the trough 122 is wholly or at least partially positioned between the lip 120 and the arched web 124. A bottom of the trough 122 defines a first low point or nadir of the arched gutter 100 relative to the first surface 140. A center of each arch 126 between the arched apexes 128 that bound the arched 126 define a second low point or nadir of the arched gutter 100 relative to the first surface 140. The bottom of the trough 122 and the center of each arch 126 between the apexes 128 can be the same or different distances away from a highest point of the first surface 140.

Figure 2:
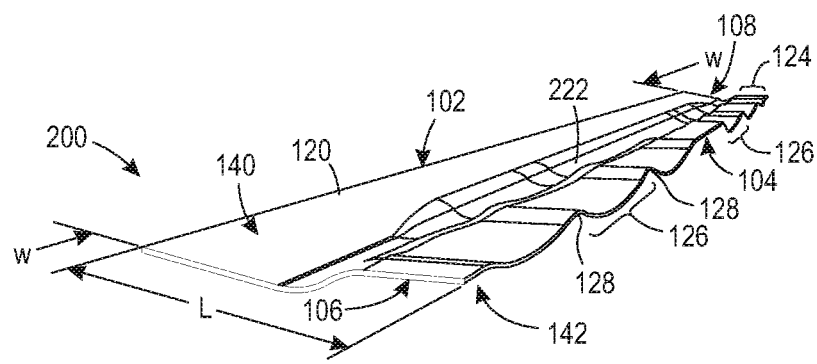
FIG. 2 is a perspective depiction of another arched gutter in accordance with another implementation of the present teachings.

While FIG. 1 depicts a first example implementation of an arched gutter 100 according to the present teachings, other implementations are contemplated. For example, FIG. 2 is a perspective depiction of another arched gutter 200 according to the present teachings, where the trough 222 extends only partially across the width W of the arched gutter 200. It will be appreciated that an arched gutter 100, 200 according to the present teachings can include other structures or features that have not been depicted for simplicity, while various depicted structures and features can be removed or modified.

The width W and length L of the arched gutter 100, 200 can vary, depending on the dimensions of the aircraft for which the arched gutter 100, 200 is designed. In an example usage, the width W of the arched gutter 100, 200 can be in the range of from about 140.0 inches to about 180.0 inches, or from about 147.6 inches to about 165.93 inches, and the length L can be from about 11.0 inches to about 18.0 inches, or from about 12.57 inches to about 14.57 inches. The arched gutter 100, 200 can have a mean thickness from the first surface 140 to the second surface 142 of from about 0.15 inches to about 0.4 inches, or from about 0.20 inches to about 0.25 inches, depending on the material from which it is formed. The arched gutter 100, 200 can be manufactured from (or including) a prepreg material including, for example, a fiberglass resin composite, a carbon fiber epoxy composite, or a metal such as titanium. Depending on the material from which the arched gutter 100, 200 is formed, methods of formation can include one or more of a hand layup process and can include an autoclave cure when formed from a prepreg material, or a stamping process when formed from metal.

Figure 3:
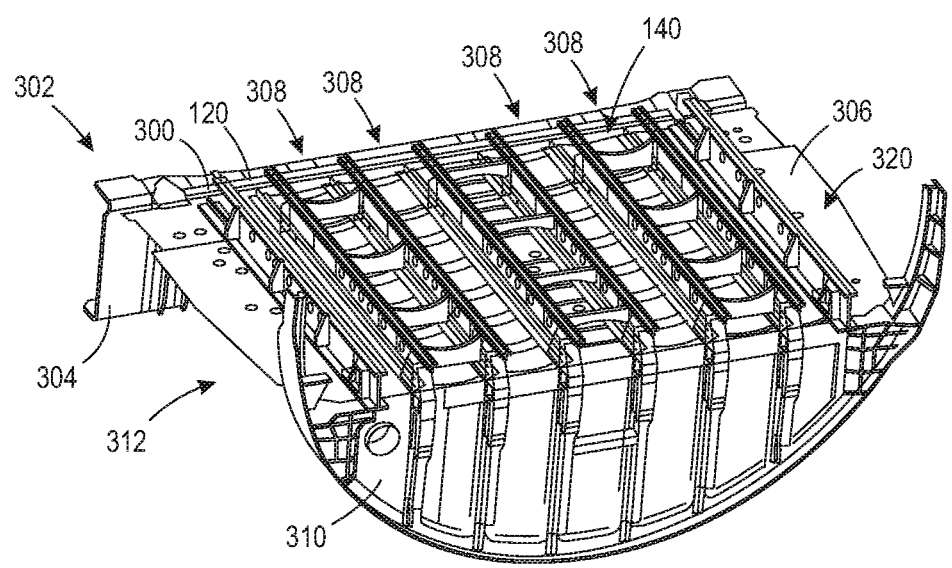
FIG. 3 is a perspective depiction of an arched gutter installed in an aircraft looking down onto an upper surface of a pressure deck.
Figure 4:
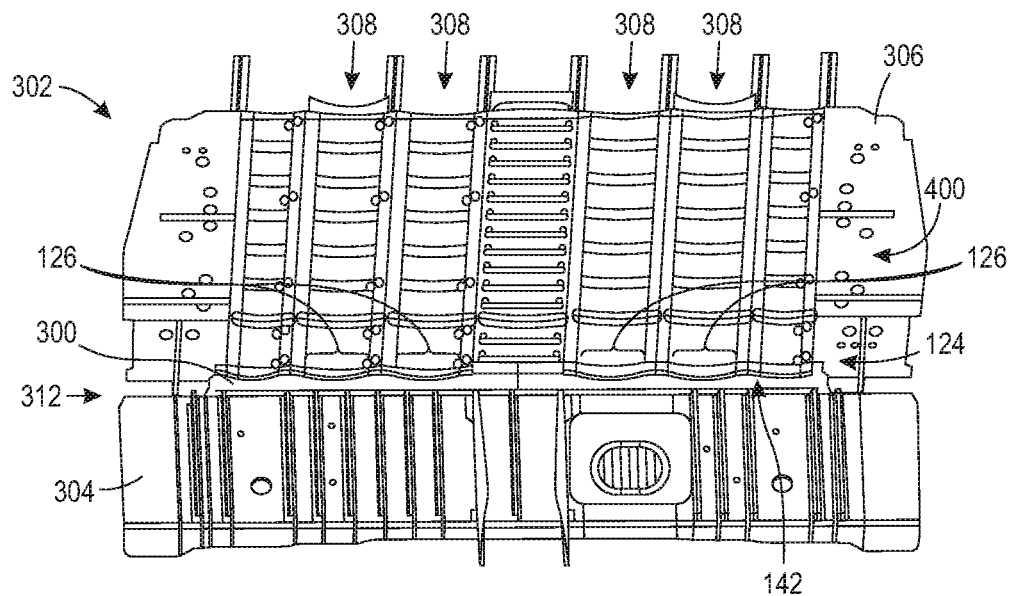
FIG. 4 is a perspective depiction of the arched gutter of FIG. 3 looking up onto a lower surface of the pressure deck of FIG. 3.
Figure 5:
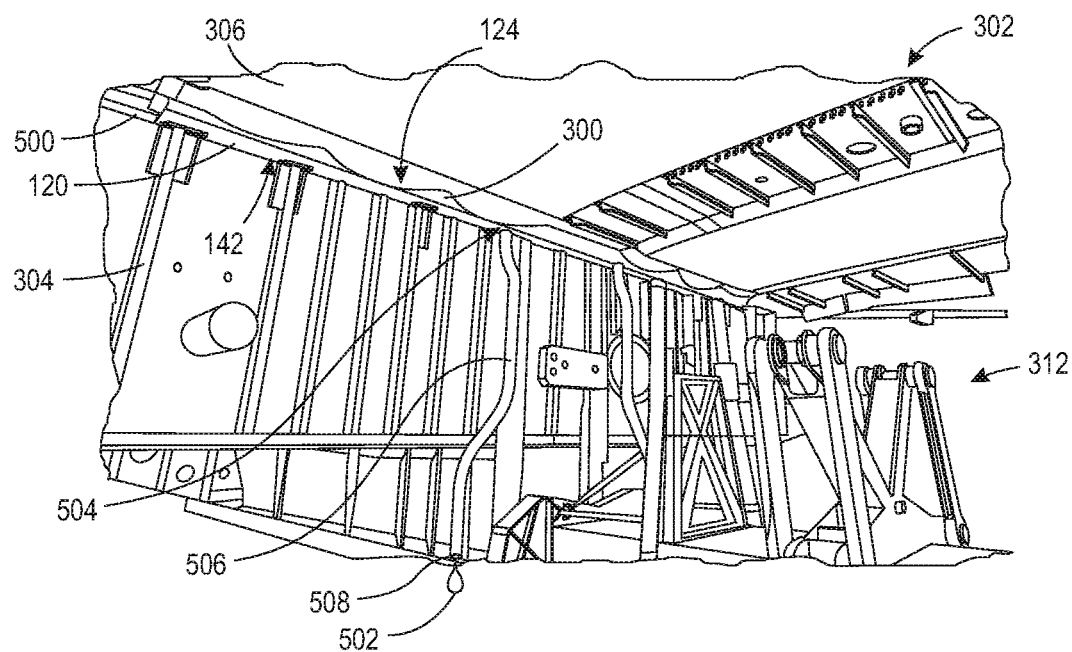
FIG. 5 is a perspective depiction of the arched gutter of FIG. 4 looking forward toward a rear spar.
Figure 6:
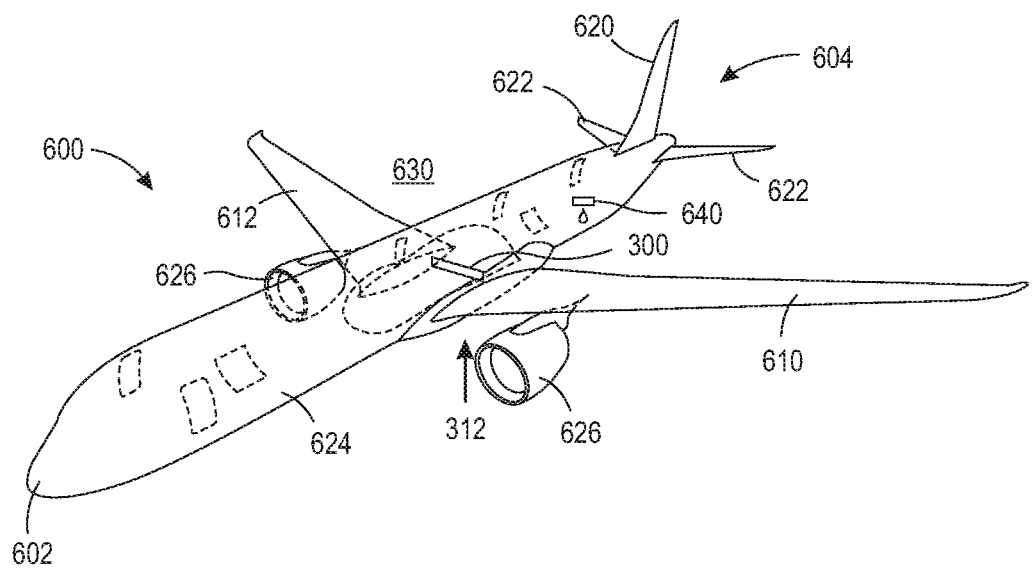
FIG. 6 is a perspective depiction of an aircraft that includes an arched gutter in accordance with an implementation of the present teachings.

FIGS. 3-6 depict an arched gutter 300 according to an implementation of the present teachings during use within an aircraft 600 (FIG. 6). The arched gutter 300 depicted in FIG. 3 can be one of the arched gutters 100, 200 depicted in, and described with reference to, FIGS. 1 and 2, or the arched gutter 300 can be another design that includes some or all of the various structural features 102-222 as depicted and describe with reference to FIGS. 1 and 2, some of which are not separately numbered in FIGS. 3-6 for simplicity. FIG. 3 is a perspective depiction of a section 302 of an aircraft assembly within the aircraft 600, and includes a rear spar 304, a pressure deck 306 including a plurality of pressure deck arches 308, and an aft wheel well bulkhead 310. The pressure deck 306 is connected to the upper wing panel 500 and the aft wheel well bulkhead 310. The rear spar 304, pressure deck 306, and the aft wheel well bulkhead 310, among other structures which are not depicted for simplicity, generally define a wheel well 312. The pressure deck 306 is generally horizontally oriented, while the rear spar 304 and the aft wheel well bulkhead 310 are generally vertically oriented, with respect to the aircraft 600. Generally, a floor of a passenger compartment (not depicted for simplicity) will overlie at least a portion of the pressure deck 306. The perspective view of FIG. 3 depicts the section 302 of the aircraft 600 looking down onto the pressure deck 306, where the section 302 is oriented with the rear spar toward a nose 602 of the aircraft 600 and the aft wheel well bulkhead 310 toward a tail section 604 of the aircraft 600. The perspective view of FIG. 4 depicts the section 302 of the aircraft 600 looking upward onto the pressure deck 306. The perspective view of FIG. 5 depicts the section 302 of the aircraft 600 looking forward toward the rear spar 304. FIG. 6 is a perspective depiction of the aircraft 600. As known in the art of aircraft manufacture, the rear spar 304 extends transversely across a width of the aircraft 600 from (and between) a first wing (e.g., a port wing) 610 to a second wing (e.g., a starboard wing) 612. As depicted in FIG. 6, the arched gutter 300 extends generally transversely across a width of the aircraft 600 between the first wing 610 and the second wing 612. FIG. 6 further depicts aircraft vertical stabilizer 620, horizontal stabilizers 622, fuselage 624, and engines 626, as well as a moisture source 640.

As depicted in FIG. 5, the lip 120 of the arched gutter 300 can underlie a lower, generally curved surface of an upper wing panel 500 and abut the rear spar 304, where the upper wing panel 500 is attached to, and is supported at least in part by, the rear spar 304. The arched gutter 300 can be attached to the upper wing panel 500 using, for example, fasteners such as bolts, nuts, etc. The arched web 124 of the arched gutter 300 can be attached to the pressure deck 306 using, for example, fasteners such as bolts, nuts, etc.

In an implementation of the present teachings, a contour of each arch 126 of the arched gutter 300 is formed to match a contour of one of the pressure deck arches 308 as depicted, for example, in FIG. 4. The upper surface 140 of the arched gutter 300 thus physically contacts a lower surface 400 of the pressure deck 306 across a width of each gutter arch 126, thereby forming a seal between the lower surface 400 of the pressure deck 306 and the upper surface 140 of the arched gutter 300, such that moisture from an upper surface 320 of the pressure deck 306 is collected within the trough 122, 222. The trough 122, 222 then routes the moisture 502 through an orifice 504, where the orifice 504 extends through, and is defined by, the arched gutter 300 from the first surface 140 to the second surface 142. Moisture is routed from the first surface 140 of the arched gutter 300 through the orifice 504 to a drain tube 506, then into the wheel well 312 through a wastewater port 508, then to an exterior 630 of the aircraft 600. The orifice can have a diameter of from about 1.5 inches to about 3.5 inches, or from about 2.0 inches to about 2.6 inches. Thus the moisture source 640 is in fluid communication with the upper surface 320 of the pressure deck 306, the trough 122, 222 and wastewater port 508 of the arched gutter 300, the drain tube 506 and the wastewater port 508, the wheel well 312, and the exterior 630 of the aircraft 600.

During operation of the aircraft 600, the wings 610, 612 flex vertically from, for example, lift, turbulence, gravitational forces, and from other forces. Stresses and strains from this movement are transferred to the pressure deck 306, which is connected to the wings 610, 612, and to the arched gutter 300, which is attached to the pressure deck 306 as described above. The pressure deck arches 308 impart a physical flexibility to the pressure deck 306, thereby allowing the pressure deck 306 to move in response to the stresses and strains applied by the movement of the wings 610, 612 during operation of the aircraft 600. Furthermore, the arches 126 of the arched web 124 impart a physical flexibility to the arched gutter 300, thereby allowing the arched gutter 300 to move in response to the stresses and strains applied by the movement of the pressure deck 306. The arches 126, in effect, allow the arched web 124 and the arched gutter 300 to move in an accordion-like fashion, thereby allowing the arched gutter 300 to flex, rather than resisting stresses and strains. The pressure deck arches 308 and the arched web 124 thereby mitigate stresses and strains that would otherwise be applied to the arched gutter 300, and thus the arched gutter 300 is resistant to damage which might otherwise result from parasitic load transfer and high bending strains during movement of the wings 610, 612.

It will be appreciated that an arched gutter 300 including the arches 126 of the arched web 124 can be manufactured from materials that may not be suitable for other gutter designs. For example, to impart a flexibility to a flat gutter, the flat gutter would be formed from a flexible synthetic material such as a polymer that is itself flexible. However, the arched gutter 300 can be manufactured from (or including) a material such as metal or metal alloy, as the arched web 124 allows the arched gutter 300 to laterally expand, contract, and twist without applying excessive stress to the material from which it is manufactured. It will be appreciated that stretching the arched web 124 outward during use, depending on the thickness and composition of the arched gutter 300, will increase the width W of the arched web 124, increase the distance between adjacent arch apexes 128, and generally decrease an arc of each arch 126. Thus the arched gutter 300 can be formed from a metal or metal alloy within a compliant thickness range. However, an arched gutter 300 manufactured from a flexible synthetic material is also contemplated.

Figure 7:
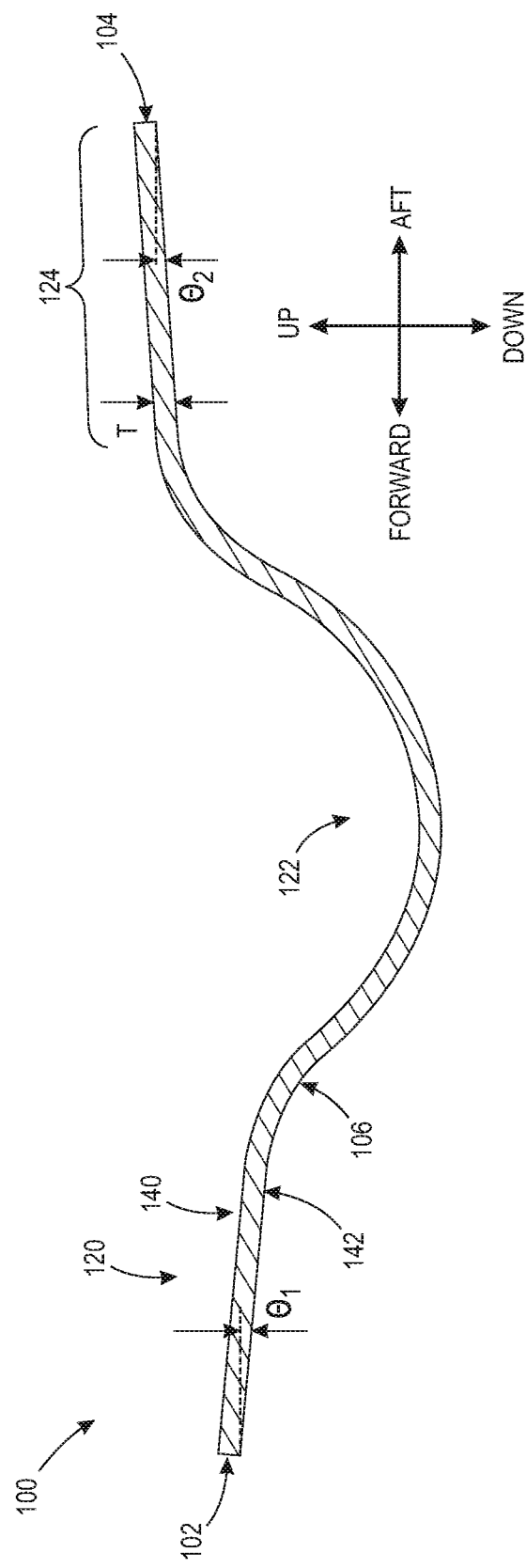
FIG. 7 is a side view of an edge of the arched gutter in accordance with an implementation of the present teachings.

FIG. 7 is a side view of an arched gutter according to an implementation of the present teachings, for example, the third edge (e.g., the port or first lateral edge) 106 of the arched gutter 100 of FIG. 1. In this implementation, a thickness "T" of the arched gutter 100 at the edge 106 is uniform from the first edge 102 to the second edge 104, and FIG. 7 depicts a contour of the third edge 106. In this implementation, the lip 120 is sloped relative to the horizontal (represented by a dashed line at the left of the figure) at a first angle of $\Theta_1$. This slope allows for the attachment of the lip 120 to the upper wing panel 500 as described above, and allows moisture to be channeled from the lip 120 to the trough 122. In an implementation, $\Theta_1$ can be from about 4.5° to about 6.5°, for example about 5.5°. As the arched gutter 100 has a uniform thickness T, both the upper surface 140 and the lower surface 142 of the arched gutter 100 at the lip 120 are sloped at the first angle $\Theta_1$ relative to the horizontal. If $\Theta_1$ is excessively small, moisture may not be channeled sufficiently from the lip 120 into the trough 122. Further, a first angle of $\Theta_1$ that is either too large or too small may not allow for proper attachment of the lip 120 of the arched gutter 100 to the upper wing panel 500. Additionally, at the third edge 106, the arched web 124 is sloped relative to the horizontal (represented by a dashed line at the right of the figure) at a second angle of $\Theta_2$. This slope allows for the attachment of the arched web 124 to the pressure deck 306 as described above, and further allows moisture to be channeled from the arched web 124 to the trough 122. In an implementation, $\Theta_2$ can be from about 3.1° to about 5.1°, for example about 4.1°. As the arched gutter 100 has a uniform thickness T, both the upper surface 140 and the lower surface 142 of the arched gutter at the third edge 106 of the arched web 124 are sloped at the second angle $\Theta_2$ relative to the horizontal. If $\Theta_2$ is excessively small, moisture may not be channeled sufficiently from the arched web 124 into the trough 122. Further, a second angle of $\Theta_2$ that is either too large or too small may not allow for proper attachment of the arched web 124 of the arched gutter 100 to the pressure deck 306.

An arched gutter in accordance with the present teachings thus has a more flexible structural design compared to conventional gutters. The physically flexible design of the arched gutter has a robust structure with an increased resistance to fatigue cracking and other wear and damage resulting from, for example, parasitic loads and high bending strains that are transferred to the arched gutter by the pressure deck during operation of the aircraft. A conventional gutter design might include a first flat surface that connects to the pressure deck and a second flat surface that connects to the upper wing panel. This flat gutter design might require reinforcing members that would stiffen the edges of the first and second flat surfaces to drive high parasitic load transfer. In contrast, the arched gutter design provides a self-supporting pressure structure without driving parasitic load transfer between the wing and the pressure deck. Because the arched gutter design mitigates stresses that would otherwise be placed on the gutter from an interaction between the upper wing panel and the pressure deck, a mean time between inspections of the arched gutter, and thus maintenance, inspection, and downtime costs, can be reduced.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications can be made to the illustrated examples without departing from the spirit and scope of the appended claims. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. An arched gutter for an aircraft, the arched gutter comprising:
   a first edge;
   a lip at least partially defined by the first edge;
   a second edge opposite the first edge;
   an arched web at least partially defined by the second edge, the arched web comprising a plurality of laterally spaced arches; and
   a trough positioned between the first edge and the second edge, wherein the lip has a substantially flat surface between the first edge and the trough.

2. The arched gutter of claim 1, further comprising a plurality of arch apexes, wherein each arch of the plurality of arches is bounded laterally between a pair of arch apexes that extend longitudinally across at least a portion of a length of the arched gutter.

3. The arched gutter of claim 1, wherein the trough is positioned between the lip and the arched web.

4. The arched gutter of claim 3, wherein the lip transitions into the trough, and the trough transitions into the arched web.

5. The arched gutter of claim 1, further comprising:
   a third edge extending between the first edge and the second edge;
   a fourth edge opposite the third edge and extending between the first edge and the second edge; and
   a width defined as a distance between the third edge and the fourth edge, wherein the width is from 140.0 inches to 180.0 inches.

6. The arched gutter of claim 5, further comprising a length defined as a distance between the first edge and the second edge, wherein the length is from 11.0 inches to 18.0 inches.

7. The arched gutter of claim 6, wherein:
   an upper surface of the arched gutter at the lip is sloped by a first angle of from 4.5° to 6.5° at the third edge; and
   the upper surface of the arched gutter at the arched web is sloped by a second angle of from 3.1° to 5.1°.

8. The arched gutter of claim 1, further comprising:
   a first surface;
   a second surface opposite the first surface; and
   an orifice that extends through the arched gutter from the first surface to the second surface, wherein the orifice comprises a diameter of from 1.5 inches to 3.5 inches.

9. An aircraft assembly, comprising:
   an upper wing panel comprising a surface;
   an aft wheel well bulkhead;
   a pressure deck connected to the upper wing panel and the aft wheel well bulkhead; and
   an arched gutter, comprising:
     a first edge;
     a lip at least partially defined by the first edge, wherein the lip is attached to the surface of the upper wing panel;
     a second edge opposite the first edge;
     an arched web at least partially defined by the second edge and attached to the pressure deck, the arched web comprising a plurality of laterally spaced arches; and
     a trough positioned between the first edge and the second edge.

10. The aircraft assembly of claim 9, wherein:
    the pressure deck comprises a plurality of pressure deck arches; and
    the plurality of laterally spaced arches of the arched web are attached to the plurality of pressure deck arches.

11. The aircraft assembly of claim 9, wherein the arched gutter further comprises a plurality of arch apexes, wherein each arch of the plurality of arches of the arched gutter is bounded laterally between a pair of arch apexes that extend longitudinally across at least a portion of a length of the arched gutter.

12. The aircraft assembly of claim 11, wherein the trough of the arched gutter is positioned between the lip and the arched web.

13. The aircraft assembly of claim 12, wherein the lip transitions into the trough, and the trough transitions into the arched web.

14. The aircraft assembly of claim 9, wherein the arched gutter further comprises:
    a third edge extending between the first edge and the second edge;
    a fourth edge opposite the third edge and extending between the first edge and the second edge; and
    a width defined as a distance between the third edge and the fourth edge, wherein the width is from 140.0 inches to 180.0 inches.

15. The aircraft assembly of claim 14, wherein the arched gutter further comprises a length defined as a distance between the first edge and the second edge, wherein the length is from 11.0 inches to 18.0 inches.

16. An aircraft, comprising:
    a first wing and a second wing;
    an upper wing panel comprising a surface and extending between the first wing and the second wing;
    an aft wheel well bulkhead;
    a pressure deck connected to the upper wing panel and the aft wheel well bulkhead;
    a rear spar connected to the upper wing panel, wherein the rear spar, the aft wheel well bulkhead, and the pressure deck define, at least in part, a wheel well of the aircraft;
    an arched gutter extending between the first wing and the second wing, the arched gutter comprising:
      a first edge;
      a lip at least partially defined by the first edge, wherein the lip is attached to the surface of the upper wing panel;
      a second edge opposite the first edge;
      an arched web at least partially defined by the second edge and attached to the pressure deck, the arched web comprising a plurality of laterally spaced arches; and
      a trough positioned between the first edge and the second edge; and
    a drain tube in fluid communication with a moisture source, the arched gutter, and the wheel well.

17. The aircraft of claim 16, wherein:
    the pressure deck comprises a plurality of pressure deck arches; and
    the plurality of laterally spaced arches of the arched web are attached to the plurality of pressure deck arches.

18. The aircraft claim 16, wherein the arched gutter further comprises a plurality of arch apexes, wherein each arch of the plurality of arches of the arched gutter is bounded laterally between a pair of arch apexes that extend longitudinally across at least a portion of a length of the arched gutter.

19. The aircraft of claim 18, wherein the trough of the arched gutter is positioned between the lip and the arched web.

20. The aircraft of claim 16, wherein:
the lip transitions into the trough, and the trough transitions into the arched web; and
the arched gutter further comprises:
- a third edge extending between the first edge and the second edge;
- a fourth edge opposite the third edge and extending between the first edge and the second edge;
- a width defined as a distance between the third edge and the fourth edge; and
- a length defined as a distance between the first edge and the second edge;

the width is from 140.0 inches to 180.0 inches; and
the length is from 11.0 inches to 18.0 inches.

21. The arched gutter of claim 1, wherein the arched web does not extend through the lip.

* * * * *